United States Patent Office 3,520,937
Patented July 21, 1970

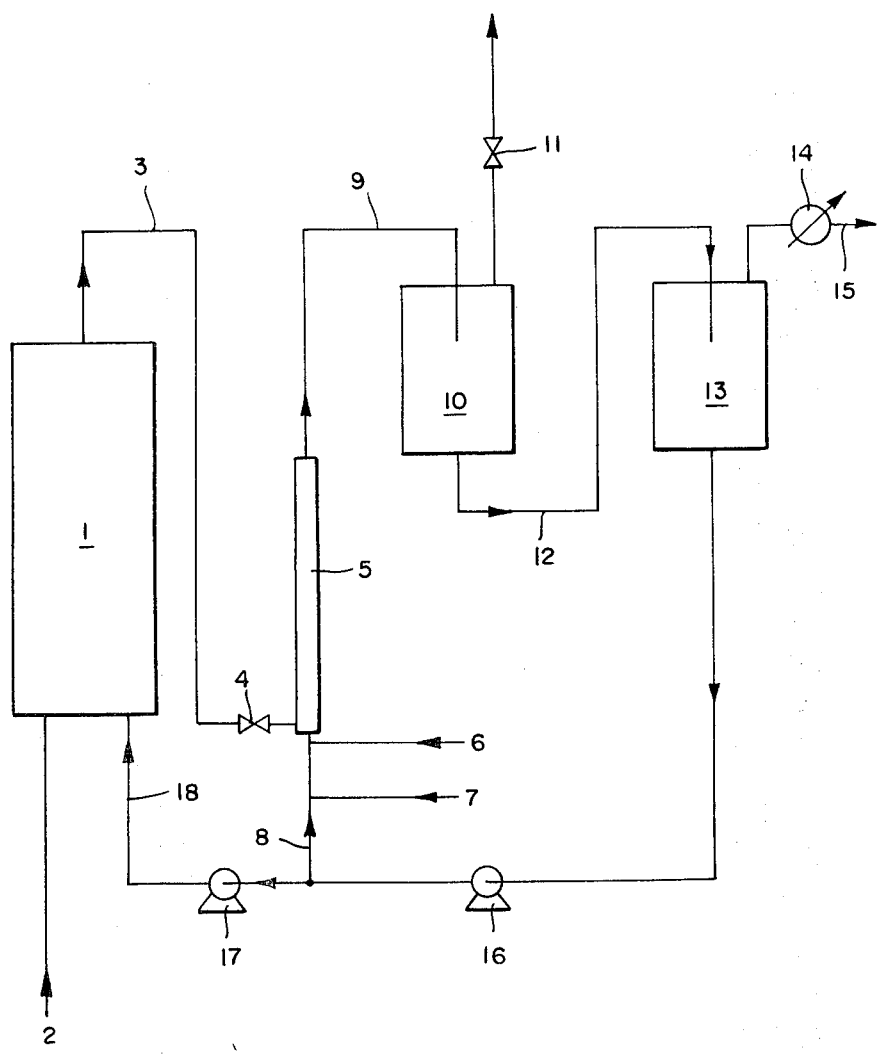

3,520,937
PROCESSING OXO REACTION MIXTURES
Hans Moell and Ernst Eckert, Ludwigshafen (Rhine),
Horst Kerber, Mannheim, Max Appl, Ludwigshafen
(Rhine), Heinz Hohenschutz, Mannheim, and Helmut
Walz, Frankenthal, Pfalz, Germany, assignors to
Badische Anilin- & Soda-Fabrik Aktiengesellschaft,
Ludwigshafen (Rhine), Germany
Filed Apr. 3, 1967, Ser. No. 627,787
Claims priority, application Germany, Apr. 5, 1966,
1,272,911
Int. Cl. C07c 45/08
U.S. Cl. 260—604     3 Claims

ABSTRACT OF THE DISCLOSURE

A process for processing oxo reaction mixtures which contain aldehydes and cobalt by treatment with an oxidizing agent in an aqueous medium at elevated temperature immediately after the production of the oxo reaction mixture.

---

This invention relates to an improved method of processing oxo reaction mixtures.

In the reaction of olefins with carbon monoxide and hydrogen at elevated temperature and superatmospheric pressure by the so-called oxo reaction it is known that reaction mixtures containing aldehydes are formed. In addition to aldehydes and alcohols, the products contain dissolved cobalt carbonyl compounds. Prior to further processing it is usual to remove the cobalt compound from the crude product. It has already been recommended to heat the crude product until the carbonyl compounds thermally decompose with consequent separation of cobalt metal, or to treat it with water or aqueous acid and an oxidizing agent, filterable compounds or dissolved salts of cobalt being obtained. This method gives a practically cobalt-free product which by subsequent distillation yields not only aldehydes and alcohols but often about 20 to 25% of high boiling components, so-called residua. It is known that the amount of residua in the crude product can be decreased by a treatment with water following the removal of cobalt. According to German patent specification No. 1,024,499 it is advantageous to use residence times of about fifteen minutes at 180° C.

It is an object of this invention to provide a process for processing oxo reaction mixtures in which a practically cobalt-free product having a low proportion of residua is obtained, in which no subsequent second treatment is required and in which only very short residence times and consequently small treatment chambers are necessary.

These and other objects are achieved in accordance with this invention in a method for processing oxo reaction mixtures containing aldehydes and cobalt by treatment with oxidizing agents in aqueous acid medium at elevated temperature, in which the treatment of the oxo reaction mixture is carried out at a temperature above 100° C. immediately after it has been produced.

In the new process a product is obtained which is practically free from cobalt and which has an extremely low proportion of residua. The treatment requires only very short residence times of a few seconds or fractions of a second. Compared with the prior art methods which require long residence times for the removal of cobalt and the subsequent breaking up of the residua, so that expensive equipment is required, it is possible according to the new process to carry out the treatment of a month's production of 6,000,000 kg. in a 30-liter mixing vessel.

Although it is known that high temperatures are of advantage in the oxidation of the cobalt compound present in the oxo product and that shorter residence times are necessary when the temperature is raised (cf. U.S. patent specification No. 2,547,178), temperatures below 100° C., particularly below 80° C. have been regarded as optimum because at higher temperatures a rapid oxidation of the aldehydes is said to set in. Surprisingly this is not the case in the new process. It is particularly surprising that in spite of very short residence times, a drastic decrease in the amount of residua is observed. If the treatment is not carried out immediately after production, but the reaction mixture is kept for some time, for example one hour, at a temperature of 100° C., or is allowed to cool first, the crude product contains in general about 20% of residua which cannot be reduced by a short treatment with an oxidizing agent in aqueous-acid medium at temperatures of more than 100° C.

Reaction mixtures obtainable by reaction of olefins, such as ethylene, propylene, heptenes and nonenes, with carbon monoxide and hydrogen by the oxo reaction generally contain 0.04 to 0.1% by weight of cobalt, 60 to 95% by weight of aldehydes and 5 to 40% by weight of alcohols, the content of dissolved unreacted olefins, carbon monoxide and hydrogen not being taken into account. The reaction mixture leaves the reactor in general at a temperature of from 130° to 180° C. and a pressure of 100 to 450 atmospheres. It is advantageous to decompress to a pressure at which the aldehyde is still substantially in the liquid phase, for example to 5 to 50, particularly 10 to 40 atmospheres in the case of the synthesis of butyraldehyde from propylene.

Many oxidizing agents which are capable of oxidizing cobalt carbonyl to divalent or trivalent cobalt compounds are suitable for the treatment. It is advantageous to choose oxidizing agents which do not contaminate the reaction mixture, for example hydrogen peroxide or advantageously oxygen or an oxygen-containing gas, for example air. The oxidizing agent is used in an amount of at least two oxidation equivalents per mole of cobalt compound, and an excess of 50 to 100% over the stoichiometric amount is in general adequate to achieve complete oxidation of the cobalt. Obviously greater excess may be used, for example three to four times the stoichiometric amount, but this does not result in any advantage. Oxidation of the aldehyde then takes place.

The treatment is carried out in aqueous-acid medium. In general the amount of water used is 0.1 to 10, advantageously 0.2 to one, times the weight of the oxo reaction mixture. The pH value of the acid medium is in general from 2 to 6, particularly from 3 to 5. Since the oxo reaction mixture already exhibits a weak acid reaction, it is often unnecessary to add acid. It is however advantageous to add small amounts of an inorganic or organic acid, the acid chosen particularly being one whose cobalt salt is directly suitable as a catalyst for the oxo reaction, for example fatty acids, such as formic acid, acetic acid or butyric acid, and the amount of acid used being at least sufficient to convert the whole of the cobalt into cobalt salts. The amount of water is advantageously large enough to keep the cobalt salt in solution and prevent it from crystallizing out during the treatment and the subsequent return of the aqueous solution resulting from the treatment to the reaction zone. Since at the same time this solution which is used as catalyst should not be too dilute, but a considerable amount of water is necessary for the treatment, it is advantageous to recycle the aqueous solution containing cobalt to the treatment chamber and to pass only a small bleed stream into the reaction zone.

Treatment is carried out at a temperature above 100° C. The temperature used in general is from 100° to 180° C., advantageously from 100° to 160° C. and preferably from 110° to 150° C. Since the oxo reaction mixture is obtained at a temperature of about 130° to 180° C., no additional heating of the mixture is necessary. The temperature of the aqueous phase used for the treatment is advantageously chosen so that the temperature of the mixture resulting in the treatment chamber is above 100° C. If the aqueous phase, which leaves the treatment chamber at a temperature above 100° C., is partly recycled, heating of the aqueous phase is in general not necessary.

The residence time in the treatment chamber may vary within wide limits. Times of more than one minute are however not generally necessary. Depending on the degree of mixing, the organic phase of the oxo reaction mixture is practically free from cobalt and ready for further processing after only a few seconds and often within fractions of a second.

The treatment is in general carried out under the pressure which results in the treatment chamber from the vapor pressure of the components. Pressures of more than 1 and up to 50 atmospheres gauge, particularly of from 5 to 40 atmospheres gauge, are generally used.

The treatment should take place immediately after the production of the oxo reaction mixture because prolonged residence or storage times prior to the treatment have an unfavorable effect on the quality of the product. The content of residua is greatly increased even by cooling and reheating. It is advantageous to avoid cooling the oxo reaction mixture to a temperature lower than 100° C. In general the time between production and treatment should be less than fifteen minutes. It is advantageous for the mixture leaving the reactor to be passed direct into the treatment zone.

The oxidizing agent, aqueous phase and oxo reaction mixture are intimately mixed to carry out the process. It is advantageous to spray the specifically lighter oxo reaction mixture in fine distribution into the treatment chamber while supplying oxidizing agent at the same time. The process is particularly elegant when the oxo mixture under high pressure is expanded direct into the aqueuos phase. The gases dissolved under pressure in the mixture atomize the mixture so finely when the pressure is released that no stirring means is necessary for good mixing.

When the treatment is over, it is advantageous first to separate the gas phase from the liquid phase, to separate the aqueous phase from the organic phase and to work up the organic phase by distillation in the usual way, if desired after it has been washed with water. The aqueous phase may be returned to the treatment chamber. It may also be used direct as a catalyst for the oxo reaction.

The invention is further illustrated by the following example. The example is given with reference to the accompanying drawing.

EXAMPLE

An oxo reaction mixture is prepared at 280 atmospheres and 156° C. in a reactor 1 from propylene, carbon monoxide and hydrogen supplied through line 2. The oxo reaction mixture leaves the reactor 1 through line 3 and is expanded through a valve 4 into a treatment chamber 5. The treatment chamber 5 has a volume of 8 liters. The hourly feed into the treatment chamber 5 is 1700 kg. of oxo reaction mixture and also about 220 cubic metres (STP) of gaseous initial materials, partly dissolved in the reaction mixture, with a content of 0.05% by weight of cobalt, 4 m.$^3$ of air through line 6, and also through line 7, 10 liters of an about 60% aqueous acetic acid and 100 liters of water and, through line 8, 515 liters of a recycled aqueous solution resulting from the treatment and containing about 1.5% by weight of cobalt. The temperature in the treatment chamber is 116° C., the pressure is 30 atmospheres gauge and the residence time is about 3 seconds. The treatment mixture is then passed through line 9 into a gas separator 10 from which gas is removed through valve 11 and the liquid phase is removed through line 12 and separated in a separator 13 into an organic phase having about 6% of dissolved water which is passed to distillation through a cooler 14 and line 15, and an aqueous phase (600 liters) of which part (515 liters) is passed through pump 16 and line 8 into the treatment chamber and part (85 liters) by means of pump 17 and line 18 into the reactor.

The treated oxo product is washed with water and is then practically free from cobalt. It has a residua content of 3.5% by weight.

We claim:

1. In a process for processing oxo reaction mixtures containing aldehydes and cobalt by treatment with an oxidizing agent selected from the group consisting of hydrogen peroxide, oxygen and gases containing oxygen in aqueous-acid medium, the improvement which comprises: maintaining the temperature of said mixture at a temperature of at least 100° C. and contacting said mixture without cooling below 100° C. with said oxidizing agent immediately after said mixture has been produced.

2. A process as claimed in claim 4 carried out at a pressure of from 1 to 50 atmospheres gauge.

3. In a process for processing oxo reaction mixtures containing aldehydes and cobalt by treatment with an oxidizing agent selected from the class consisting of hydrogen peroxide, oxygen and gases containing oxygen, in an aqueous-acid medium at a pH value of from 2 to 6 at elevated temperature, the improvement which comprises carrying out the treatment of the oxo reaction mixture at a temperature of from 110° to 150° and a pressure of from 1 to 50 atmospheres gauge immediately after the oxo reaction mixture has been produced.

References Cited

UNITED STATES PATENTS 2,547,178  4/1951  Spence.
2,963,514  12/1960  Rehn et al.

BERNARD HELFIN, Primary Examiner